(12) United States Patent
Madhusudan (10) Patent No.: US 11,437,803 B2
(45) Date of Patent: Sep. 6, 2022

(54) METHODS AND SYSTEMS FOR ACTIVE LIGHTNING PREVENTION

(71) Applicant: Bell Textron, Inc., Fort Worth, TX (US)

(72) Inventor: Phalgun Madhusudan, Urbana, IL (US)

(73) Assignee: TEXTRON INNOVATIONS INC., Providence, RI (US)

( * ) Notice: Subject to any disclaimer, the term of this patent is extended or adjusted under 35 U.S.C. 154(b) by 214 days.

(21) Appl. No.: 16/854,867

(22) Filed: Apr. 21, 2020

(65) Prior Publication Data
US 2021/0328419 A1     Oct. 21, 2021

(51) Int. Cl.
| | | |
|---|---|---|
| *B64D 45/02* | (2006.01) | |
| *H02G 13/00* | (2006.01) | |
| *H01Q 1/50* | (2006.01) | |
| *H01Q 1/12* | (2006.01) | |
| *H01Q 1/28* | (2006.01) | |

(52) U.S. Cl.
CPC ............. *H02G 13/60* (2013.01); *B64D 45/02* (2013.01); *H01Q 1/125* (2013.01); *H01Q 1/28* (2013.01); *H01Q 1/50* (2013.01)

(58) Field of Classification Search
CPC ........ H02G 13/00; H02G 13/60; H02G 13/80; H01Q 1/50; H01Q 1/28; H01Q 1/12; H01Q 1/125; B64D 45/02; H02H 3/22; H02H 1/0007; G01R 33/10; B64C 1/12
USPC ......................................... 361/218
See application file for complete search history.

(56) References Cited

U.S. PATENT DOCUMENTS

| | | | | |
|---|---|---|---|---|
| 2009/0234583 A1* | 9/2009 | Dwyer | .................... | G01W 1/16 324/72 |
| 2010/0023267 A1* | 1/2010 | Karabin | .................. | G01W 1/16 324/72 |

OTHER PUBLICATIONS http://stormhighway.com/blog2010/june1510a.php.

* cited by examiner

*Primary Examiner* — Danny Nguyen
(74) *Attorney, Agent, or Firm* — Pramudji Law Group PLLC; Ari Pramudji (57) ABSTRACT

According to one implementation of the present disclosure, a method for field destabilization is disclosed. The method includes detecting, on or proximate to one or more aerial surfaces, a presence of an electric-field above a predetermined threshold; positioning the one or more antennas towards the one or more aerial surfaces; and transmitting electromagnetic waves towards the one or more aerial surfaces.

20 Claims, 4 Drawing Sheets

METHODS AND SYSTEMS FOR ACTIVE LIGHTNING PREVENTION

STATEMENT REGARDING FEDERALLY SPONSORED RESEARCH OR DEVELOPMENT

Not applicable.

BACKGROUND

This section is intended to provide background information to facilitate a better understanding of various technologies described herein. As the section's title implies, this is a discussion of related art. That such art is related in no way implies that it is prior art. The related art may or may not be prior art. It should therefore be understood that the statements in this section are to be read in this light, and not as admissions of prior art.

Aircrafts and aerial platforms of buildings and/or monuments are often susceptible to lightning strikes because they are made of conductive materials. For example, an aircraft flying into a storm or a storm passing in the vicinity of a building often provide conductive paths for lightning discharges (i.e., leader attachment) to occur and hence, the likelihood of lightning strikes increases. Accordingly, active prevention of leader attachment is an ongoing need in the art.

SUMMARY

According to one implementation of the present disclosure, a method for field destabilization is disclosed. The method includes detecting, on or proximate to one or more aerial surfaces, a presence of an electric-field above a predetermined threshold; positioning the one or more antennas towards the one or more aerial surfaces; and transmitting electromagnetic waves towards the one or more aerial surfaces.

According to another implementation of the present disclosure, a computer system is disclosed. The system includes one or more sensors coupled to one or more aerial surfaces and configured to detect whether a presence of an electric field, on or proximate to one or more aerial surfaces, is above a predetermined threshold; and a control system coupled to the one or more sensors, and configured to receive sensor data from the one or more sensors and to activate the one or more antennas to transmit electromagnetic waves to the one or more aerial surfaces.

According to another implementation of the present disclosure, a computer system is disclosed. The computer system includes a processor and a memory accessible to the processor. The memory stores instructions that are executable by the processor to perform operations including: detecting, on or proximate to one or more aerial surfaces, a presence of an electric-field above a predetermined threshold; positioning the one or more antennas towards the one or more aerial surfaces; and activating the one or more antennas to transmit electro-magnetic waves towards the one or more aerial surfaces.

The above-referenced summary section is provided to introduce a selection of concepts in a simplified form that are further described below in the detailed description section. Additional concepts and various other implementations are also described in the detailed description. The summary is not intended to identify key features or essential features of the claimed subject matter, nor is it intended to be used to limit the scope of the claimed subject matter, nor is it intended to limit the number of inventions described herein. Furthermore, the claimed subject matter is not limited to implementations that solve any or all disadvantages noted in any part of this disclosure.

BRIEF DESCRIPTION OF THE DRAWINGS

The present technique(s) will be described further, by way of example, with reference to embodiments thereof as illustrated in the accompanying drawings. It should be understood, however, that the accompanying drawings illustrate only the various implementations described herein and are not meant to limit the scope of various techniques, methods, systems, or apparatuses described herein.

Reference is made in the following detailed description to accompanying drawings, which form a part hereof, wherein like numerals may designate like parts throughout that are corresponding and/or analogous. It will be appreciated that the figures have not necessarily been drawn to scale, such as for simplicity and/or clarity of illustration. For example, dimensions of some aspects may be exaggerated relative to others. Further, it is to be understood that other embodiments may be utilized. Furthermore, structural and/or other changes may be made without departing from claimed subject matter. References throughout this specification to "claimed subject matter" refer to subject matter intended to be covered by one or more claims, or any portion thereof, and are not necessarily intended to refer to a complete claim set, to a particular combination of claim sets (e.g., method claims, apparatus claims, etc.), or to a particular claim. It should also be noted that directions and/or references, for example, such as up, down, top, bottom, and so on, may be used to facilitate discussion of drawings and are not intended to restrict application of claimed subject matter. Therefore, the following detailed description is not to be taken to limit claimed subject matter and/or equivalents.

DETAILED DESCRIPTION

As observed when flying near thunderstorms/lightning storms, aircrafts are often susceptible to lightning strikes. Similarly, aerial platforms on buildings or monuments are also prone to lightning strikes during thunderstorms/lightning storms. Lightning strikes can occur when in a lightning environment, surfaces of an aircraft or an aerial platform become charged to such an extent that that both metallic and dielectric parts of the surfaces may be temporarily polarized.

According to research and modeling associated with the inventive aspects as described herein, it is observed that conditions for lightning strikes ripen when the formation of tiny channels of ionized air (i.e., ionized plasma channels) are stabilized with electric and magnetic fields generated by the movement of the ionized plasma channels through atmospheric air. This stabilization is known as the formation of "stable streamers". Next, as stable streamers come in contact (i.e., connect) with "lightning leaders" (i.e., ionized plasma columns/channels generated when metallic and dielectric surfaces of an aerial surface/platform are sufficiently charged), "leader attachment" would result. The connection between the stable streamers and lightning leaders is henceforth referenced as leader attachment. Once leader attachment may be achieved, a full lightning discharge path may be completed, and conditions would now be present for imminent lightning strike occurrences and re-occurrences.

Systems and methods of the present disclosure actively prevent the completion of a full lightning discharge path. Specifically, the systems and methods actively prevent leader attachment to aerial vehicles (e.g., aircrafts (i.e., aerial vehicles) (e.g., airplanes, rotorcrafts, commercial drones, unmanned aerial vehicles, etc.) or aerial stationary platforms (e.g., skyscrapers, towers, statues/monuments, etc.). Advantageously, in certain implementations, the inventive aspects as described herein specifically prevent leader attachment by distortion (e.g., collapse) of ionized plasma channels generated on aircraft or platform surfaces. Specifically, the plasma channels may be distorted by disruption of the electric and magnetic fields around the aircraft. Accordingly, active prevention of lightning strikes may be realized through the utilization of radiated fields.

Figure 1:
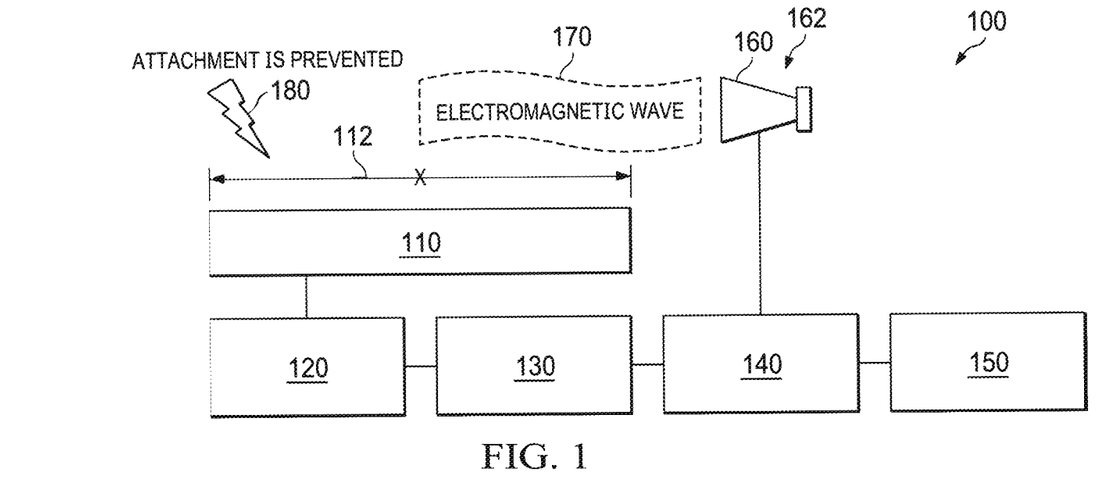
FIG. 1 illustrates a diagram in accordance with implementations of various techniques described herein.

Referring to FIG. 1, an example aerial system 100 (e.g., aircraft system or aerial platform system) implementing a lightning prevention system using radiated fields is shown. In one example, as illustrated, the aerial system 100 may include one or more aerial surfaces 110 (e.g., aircraft surfaces, aerial platforms), one or more sensors 120 (e.g., electroscope sensors), control system 130 (i.e., control logic system), a waveform generator 140, a power source 150 and one or more antennas (e.g., a horn antennas) 160. Also shown in FIG. 1 are electromagnetic waves 170 and potential leader attachment 180 of a lightning strike episode. The control system 130 may be electrically coupled (e.g., physically or wirelessly coupled) to the one or more sensors 120 (e.g., electroscope sensors), the waveform generator 140, and the power source 150.

In FIG. 1, the one or more aerial surfaces 110 are shown to be in a lightning zone 112. A lightning zone 112 includes regions (e.g., the length of "X") of the aerial platforms or surfaces that having the highest likelihood of leader attachment. In various implementations, the lightning zones 112 may be predetermined based on prior operational lightning data analysis and/or real-time data received while in operation.

In certain implementations, the one or more aerial surfaces 110 may include aircraft surfaces made from different metal materials including, but not limited to, aluminum, titanium, and their respective alloys. Moreover, such aircraft surfaces 110 may comprise any exterior metal portion (i.e., metal surface) of the aircraft including, but not limited to the fuselage (i.e., body), wings, fins, etc. In certain implementations, where the aircraft may be a rotorcraft, the aircraft surfaces may comprise any exterior metal portion (i.e., metal surface) including, but not limited to the main rotor, the tail boom, tail rotor, etc.

In other implementations, the one or more aerial surfaces 110 may comprise aerial surfaces made from different metal materials including, but not limited to, aluminum and steel alloys. Moreover, such aerial surfaces 110 may include any exterior metal portion (i.e., metal surface) of buildings (e.g., skyscrapers) or other structures.

The one or more sensors 120 of the aerial system 100 may comprise any type of sensor that can detect the presence of electric charge on the various aerial surfaces 110 (i.e., surfaces) including, but not limited to, electroscope sensors. In such instances, the electroscope sensors may provide an approximate indication of the quantity of charge on such surfaces 110. In some cases, the sensors 120 may be coupled to, but separate from, the aerial surfaces 110 and in other cases, the sensors 120 may be attached to an under-side (e.g., underneath, behind) of the aerial surfaces 110.

In various cases, charging of the aerial surfaces 110 may be non-uniform. For instance, with reference to aircrafts and rotorcrafts, surfaces 110 that include sharp edges (such as the nose, tail, discharge wicks, and rotors) may be charged much faster and to much higher potentials in comparison to other surfaces. Measurements of charge may be accomplished by placing the sensors 120 (e.g., electroscopes) underneath the surfaces 110. In certain instances, with reference to aircrafts, various sources of static fields may be present inside the aircraft, and hence, appropriate care should be taken to tune the sensors 120 to a threshold that would be exceeded on the account of lightning and not because of, for example, triboelectric charging or internal fields. It is further noted that the process of streamer formation would involve development of vast amounts of charges on the aerial surfaces 110. Also, the charging of the metallic and dielectric parts of the aerial surfaces 110 would be temporary and would last for a duration of external excitation.

The control system (i.e., control logic) 130 may be configured to receive sensor data (i.e., charging sensor data) from the sensors 120 and in turn, activate operation of lighting prevention systems (as described herein). At the appropriate time, the control system 130 may activate the waveform generator 140 to generate electro-magnetic waveforms 170 to be transmitted to the one or more antennas 160. Further, the control system 130 may orient and activate the one or more antennas 160 to transmit the electro-magnetic waveforms 170 to various regions of the one or more aerial surfaces 110.

The control system (i.e., control logic) 130 of the aerial system 100 may be either fully separated from, separate but coupled to, or incorporated within a primary electronic control system. In certain implementations, where the aerial system 100 is an aircraft system, the control system may be a flight control computer of an aircraft (e.g., a fly-by-wire control system of a rotorcraft). Such a flight control computer (not shown) may include a control laws module that generates actuator position commands to move actuators based on sensor data from various flight control sensors. In contrast, the control system 130 would include control logic to implement the procedure 500 (as described with reference to FIG. 5) and as part of an active lightning strike prevention program 624 (as described with reference to FIG. 6).

The one or more antennas 160 may include an array of conductors, electrically connected to a transmitter (not shown). As an example, as electrons in electric current "wiggle" (i.e., vibrate) back and forth along the one or more antennas 160, the electrons may create invisible electromagnetic radiation in the form of radio waves. Accordingly, in certain implementations, the one or more antennas 160 would be an interface between the radio waves (propagating through space) and electric currents moving in metal conductors generated from the waveform generator 140.

In certain cases, the waveform generator 140 may be any type of signal generator used to generate the electro-magnetic waveforms 170 over a wide range of signals. Electromagnetic waves are generated by movement of electrons. In turn, the movement of electrons generate a magnetic field that will also become wavy from the motion of the electron. These combined electrical and magnetic waves reinforce one another.

The one or more antennas 160 may be designed to transmit radio waves (e.g., low-frequency electromagnetic waves 170) in all horizontal directions equally (e.g., omni-directional antennas) or in a particular direction (e.g., directional (e.g., directional, high-gain, or "beam" antennas)). Also, the one or more antennas 160 may further include components such as a transmitter (not shown), horn antenna 162 (i.e., a microwave horn), and/or parasitic elements (not shown). The one or more antennas 160 may further include other components (not connected to the transmitter, the horn 162, and/or the parasitic elements) that serve to direct the radio waves into a beam or other desired radiation pattern.

In some cases, the horn antenna 162 may include a short length (e.g., 12-24 cm) of rectangular or cylindrical metal tube (i.e., the waveguide), closed at one end, and flaring into an open-ended conical or pyramidal shaped horn on the other end. In some instances, radio waves may be introduced into the waveguide by a coaxial cable attached to the side, with the central conductor projecting into the waveguide to form a quarter-wave monopole antenna. The waves would then radiate out the horn end in a narrow beam. In other instances, the radio waves are conducted between the transmitter and the antenna by a waveguide. In such instances, the horn may be attached to the end of the waveguide.

In certain implementations where the aerial system 100 is an aircraft system, the power source 150 may include generators, alternators, ultracapacitors or supercapacitors, regenerative systems or auxiliary power units, or batteries (e.g., lead, acid, or lithium ion battery types). In other implementations, where the aerial system 100 is an aerial platform system, the power source 150 may include power supplied from a local power grid among the above-mentioned power sources or other commonly utilized power sources.

Figure 2:
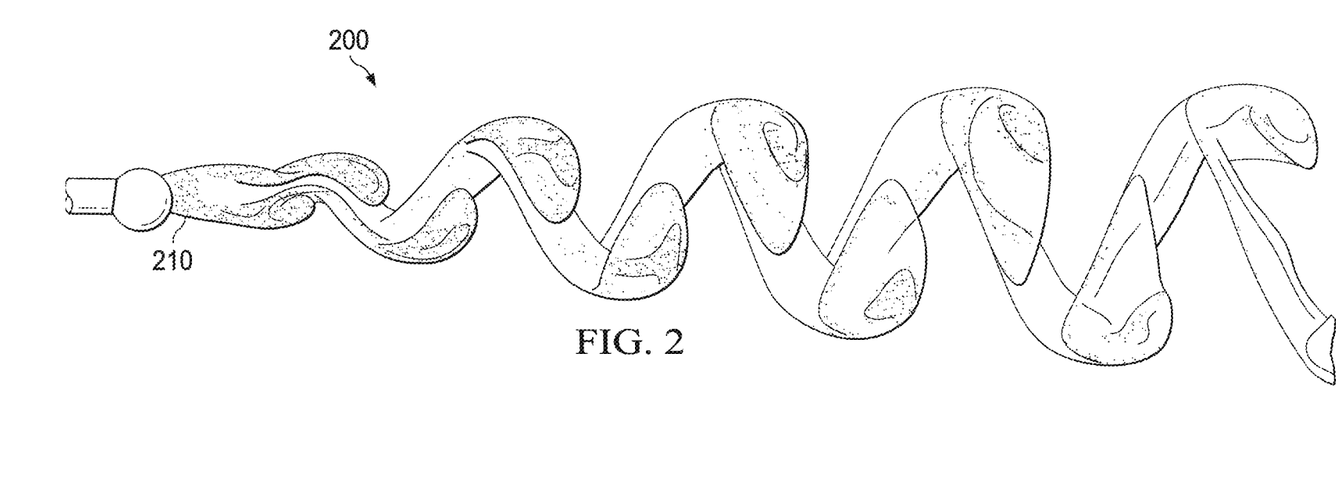
FIG. 2 illustrates a diagram in accordance with implementations of various techniques described herein.

Referring to FIG. 2, a diagram (i.e., a visualization) of the Karman vortex street 200 is shown. The Karman vortex street 200 is a repeating pattern of swirling vortices, caused by a process known as vortex shedding. Vortex shedding would be responsible for the unsteady separation of flow of a fluid around blunt bodies. Also, as shown in FIG. 2, the point at where vortex shedding would commence is known as the Karman vortex point 210. As theorized, observed and verified through analysis, the Karman vortex street 200 may correspond to charging theory in the development of lightning strikes. For example, charge (i.e., charged particles) may build up in clouds due to convection in the atmosphere. Moreover, discharge would be initiated by a local drop in electric field permittivity caused by air flow patterns.

Figure 3:
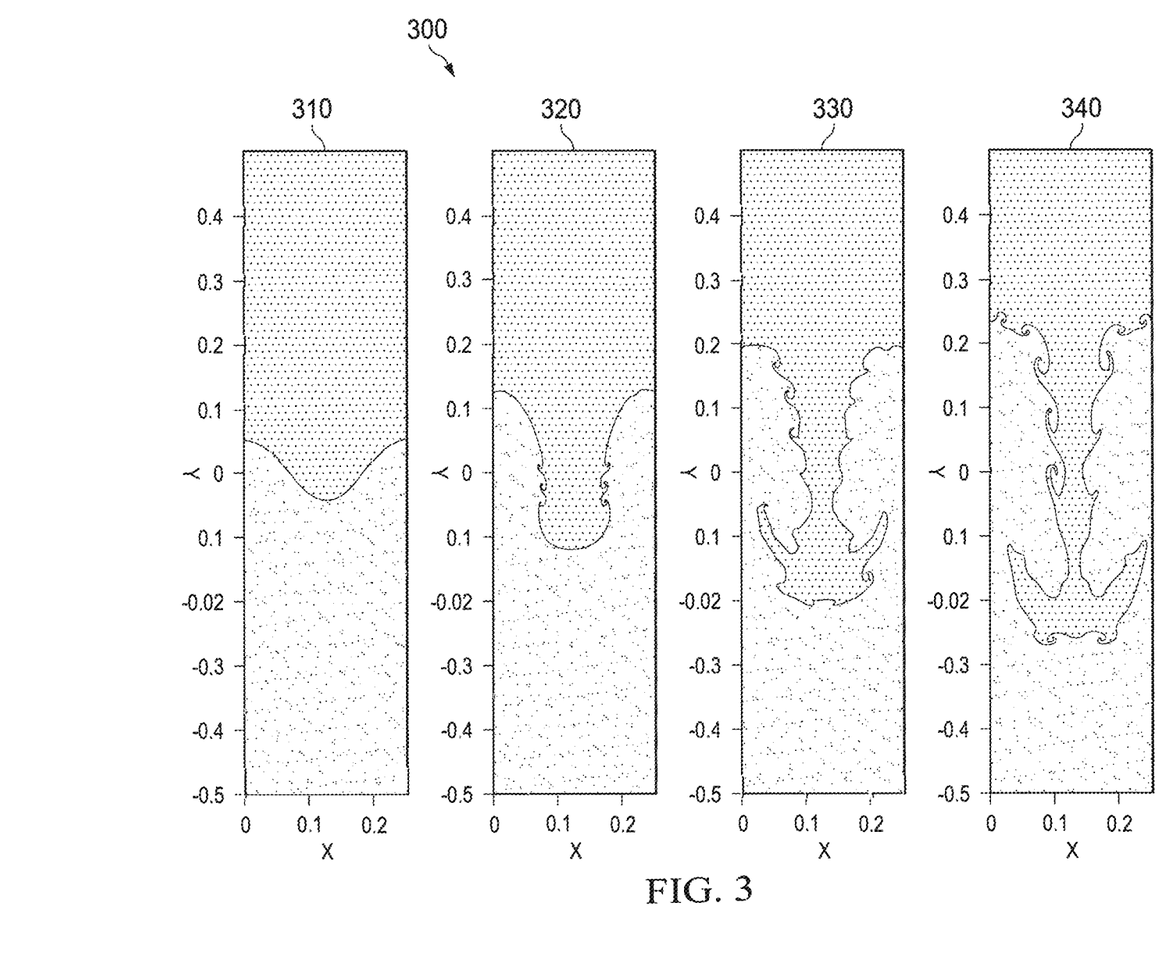
FIG. 3 illustrate graphs in accordance with implementations of various techniques described herein.

Referring to FIG. 3, a sequence of cartesian graphs 300 illustrating a hydrodynamics simulation of Rayleigh-Taylor instability (i.e., RT instability) is shown. RT instability is an instability of an interface between two fluids of different densities that may occur when a lighter fluid is pushing a heavier fluid. One example of RT instability behavior may include water suspended above oil. As shown in FIG. 3, the simulation shows cartesian graphs 310, 320, 330, and 340 each illustrating successive stages (i.e., snapshots, frames) in a sequence. In each of the cartesian graphs 310-340 (i.e., graphs), a y-component is shown from 0.4 to −0.5 and an x-component from 0 to 0.2. As depicted, the X and Y components may be arbitrary units of length, proportional to the magnitude of the disturbing field (e.g., in the case of fluids, for pressure gradients; in the case of fields, for potential or electric-fields; and in the case of lightning, a combination of the pressure drop created by the movement of layers of air against each other and against the cloud particles and the local electric field caused by the charge separation between the cloud and the ground). Correspondingly, for lightning, the X and Y components may be in units of tens of meters (m).

As theorized, observed and verified through analysis, the instability behavior may also correspond to the movement of charged particles in air. Accordingly, the charged particles in clouds would flow through regions in the air where they may seek out oppositely charged surfaces/ground. The movement of these charges may be in the form of thin filaments (i.e., streamers). In the case of lightning, the primary branch is called a leader. Of note, with references to the graphs 310-340, at the Karman Vortex point 302 (i.e., initially at y=0 in FIG. 310), the RT instability can be one underlying cause for the commencement of leader formation (i.e., the progression of streamers).

Figure 4A:
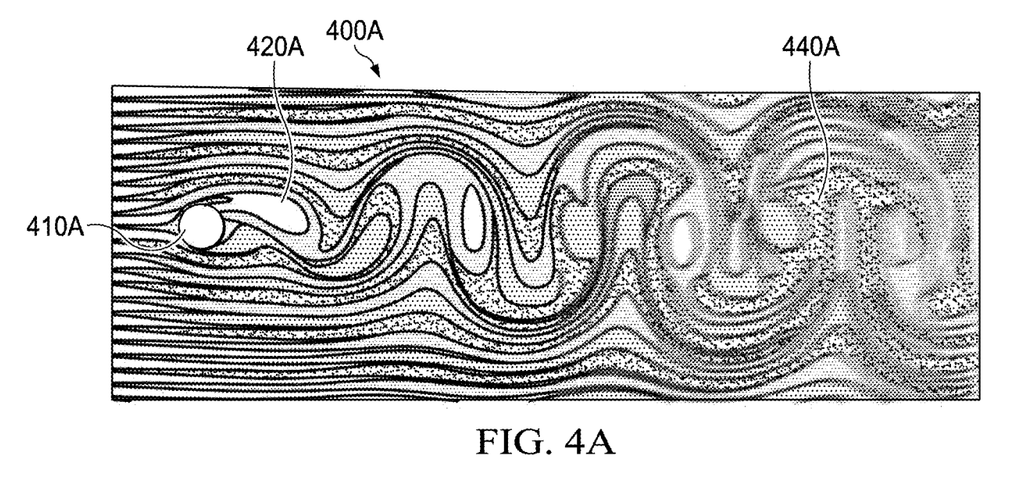
FIGS. 4A-4B illustrate diagrams in accordance with implementations of various techniques described herein.
Figure 4B:
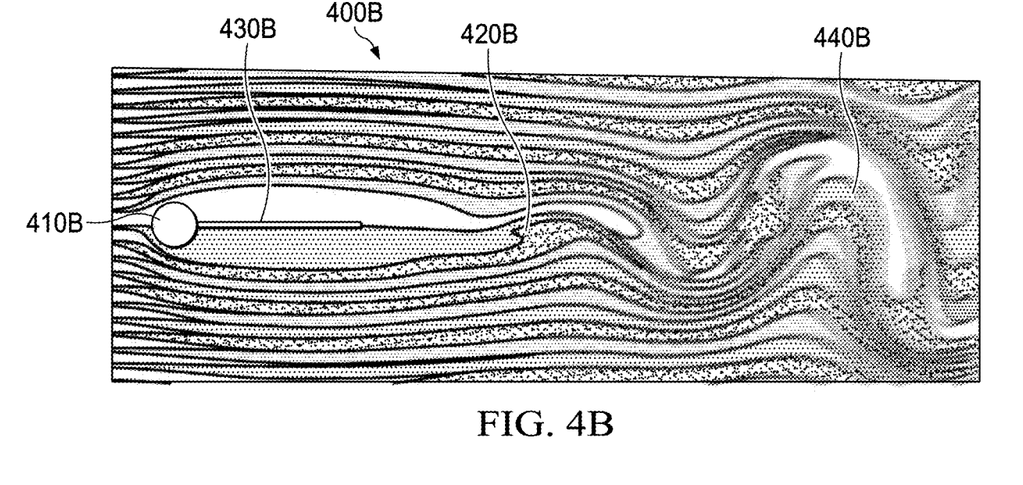

Referring to FIGS. 4A and 4B, two diagrams (400A, 400B) of plasma channels are shown. In two different representations, FIGS. 4A and 4B depict plasma channel leaders (410A, 410B) (i.e., an ionized column, tip, leader) represented along with, at 420A, 420B, and the plasma channel when stabilized. FIG. 4B further depicts the tail 430B of the leader 410B. Also depicted, is the plasma channel collapse (i.e., spreading), at 440A, 440B, in the absence of electric and magnetic fields.

In various implementations, specifically, the leader (e.g., 410A, 410B) may be formed in clouds where an electric field may be "high enough" to sustain breakdown (according to the Paschen curve where the altitude may determine the dielectric strength of the air (e.g., breakdown voltage (V) vs. pressure× gap (Torr inches)). In certain examples, water droplets may breakdown at 900 kV/m and ice crystals may breakdown at 500 kV/m. In instances of negative flash discharge, the leader may take a zig-zag path, in steps of 50 m and pauses of 20-100 μs. Further, negative flashes may discharge several charge centers in succession. Accordingly, there may be distinct pulses in current that can cause initial and subsequent return strokes.

Further attributes of leaders (e.g., 410A, 410B) include having a diameter between 1 to 10 m, were approximately 100 A current may be concentrated in a highly ionized core having approximately 1cm diameter. The average velocity of propagation may be $2 \times 10^5$ m/s. Also, the leader can form branches during propagation. As it nears the ground/surfaces, charge center from objects like towers generate their own "leaders". When the leaders collide, a connection would be established leading to a flash occurrence.

According to inventive aspects, such leaders may be stabilized by fast-moving electric and magnetic fields (e.g., traveling at speeds of 95,000 m/s). Further, discharge can occur when a leader may connect to an oppositely charged streamer. Also, various conductors placed in high charge zones may further tend to cause discharge, and thus release streamers themselves. Moreover, as the plasma columns generated by the leader become stabilized even after first discharge, subsequent discharges become much more likely.

Advantageously, schemes and techniques described herein provide for the capability to prevent stable streamer formation through plasma channel distortion (i.e., field destabilization). According to inventive aspects, plasma channels would collapse when the stabilizing electric and magnetic fields are disrupted. As oscillating electric fields tend to "draw out" charges in the direction of the electric field while oscillating magnetic fields tend to accelerate moving charges in a perpendicular direction, when a certain frequency of oscillation may be attained, the effects of the electric and magnetic fields attaining a "maximum" level of plasma channel distortion lead to a complete collapse of the plasma channels. In certain instances, the maximum level of plasma channel distortion can be defined as the angle whereby the plasma channel would bend away from the trajectory it would originally take in the absence of any perturbing field. For example, a complete plasma channel collapse would happen at 90 degrees or 0.5 Pi radian deflection. For aircraft applications, a collapse of field strength to the point the dielectric breakdown strength of air (at that altitude) would be sufficient. In various implementations, the collapse of field strength may be computed as: E (breakdown) E (lightning) cos (D) (where D is the distortion/deflection angle). Moreover, such a parameter would also be altitude dependent.

To achieve field destabilization, the power carried by electronic waves originating at the waveform generator 140 and the power source 150 may be preset in approximately 10-90 kW range. Moreover, the destabilization of a streamer (e.g., a monopolar streamer) is found to occur in a frequency range between 80-150 Hz. Hence, according to the inventive aspects, the utilization of high intensity, low frequency radio waves, would be one optimal solution to disrupt plasma channels and prevent lightning strike.

Figure 5:
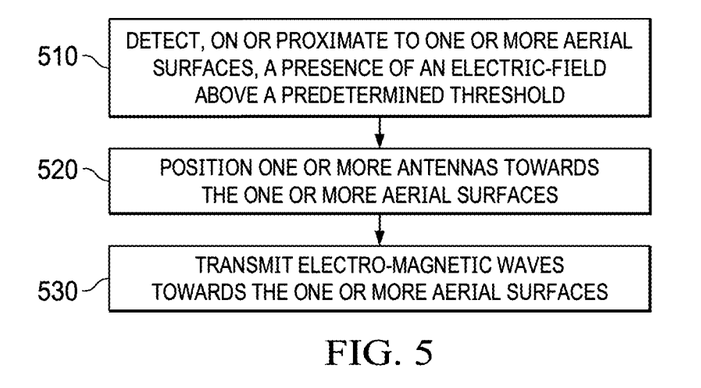
FIG. 5 is a particular illustrative aspect of methods in accordance with implementations of various techniques described herein.
Figure 6:
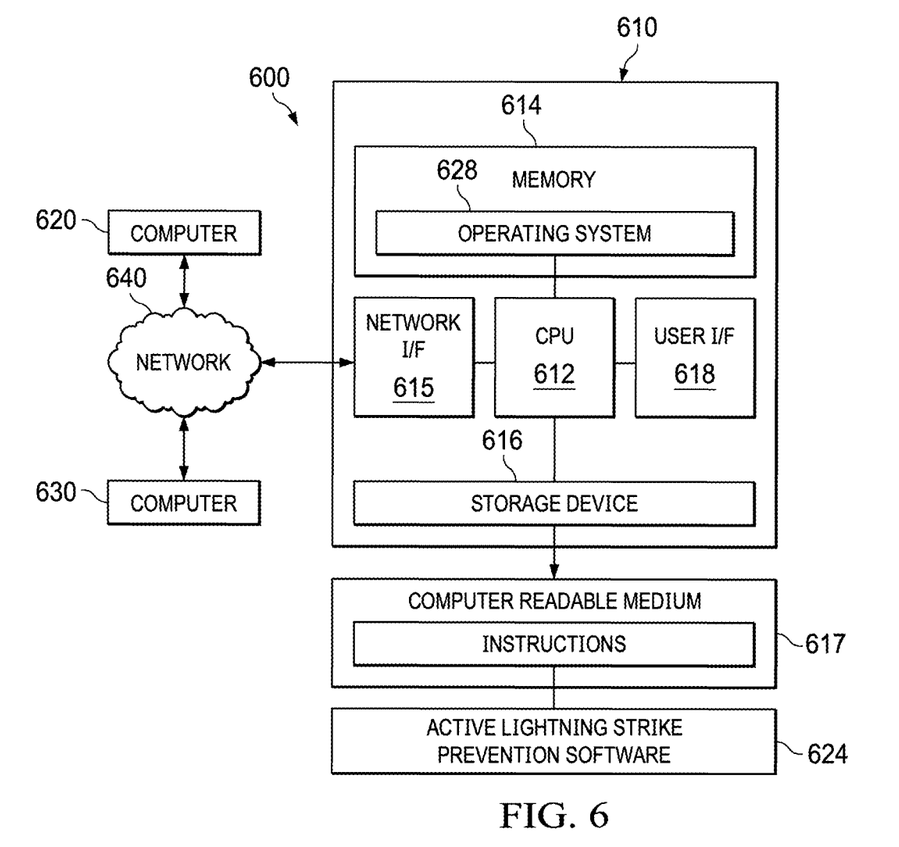
FIG. 6 is a block diagram of a computer system in accordance with implementations of various techniques described herein.

Referring to FIG. 5, a flowchart of an example operational method 500 (i.e., procedure) for the aerial system 100 is shown. Advantageously, the operational method 500 can achieve field destabilization by preventing stable streamers from forming on aerial surfaces (e.g., aerial surfaces 110 in FIG. 1). The example procedure 500 may be implemented as part of an active lightning strike prevention program 624 (as shown in FIG. 6).

In the example operation, prior to use, one or more antennas 160 can be placed coupled to (e.g., attached to) to the aerial surface 110 within the aerial system 110 such that electromagnetic waves 170 (e.g. beams) would radiate towards the regions of the aerial surfaces 100 in respective lightning zones 112 (i.e., areas of the aerial surfaces 110 that have the highest likelihood of leader attachment 180) (e.g., significantly above a predetermined leader attachment threshold).

At block 510, a presence of an electric-field above a predetermined threshold may be detected on or proximate to one or more aerial surfaces. For example, as shown in FIG. 1, the one or more sensors 120 (e.g., electroscope sensors) may detect whether "charging" has commenced (i.e., a presence of an electric-field is determined to be above a predetermined threshold) either on or near (proximate to) the one or more aerial surfaces 110. In certain implementations, the predetermined threshold would be 5% of Dielectric breakdown strength at the given altitude (and to be determined from the Paschen curve).

At block 520, one or more antennas may be positioned towards the one or more aerial surfaces. For example, as shown in FIG. 1, the one or more antennas 160 may be positioned (i.e., oriented) towards the one or more aerial surfaces 110. In certain implementations, in response to the detection of the electric-field, one or more antennas 160 may be activated (e.g., autonomously activated in certain cases).

At block 530, electro-magnetic waves may be transmitted towards the one or more aerial surfaces 110. For example, as shown in FIG. 1, the one or more antennas 160 may transmit low frequency electro-magnetic waves towards the one or more aerial surfaces 110. In certain implementations, a radio transmitter may supply an electric current to terminals of the one or more antennas. Subsequently, the one or more antennas 160 may radiate energy from the current as electromagnetic waves (i.e., radio waves).

Also, according to other aspects of the operational method, in response to the detection, the one or more antennas may be automatically activated. For example, with reference to FIG. 1, the one or more antennas 160 may be configured to automatically activate upon a detection of an electric-field by the one or more electroscope sensors 120.

In addition, advantageously, in certain cases, as radiated fields (i.e. radio-frequency energy from the antennas 160) would not be "on" throughout normal operation (e.g., of an aircraft), no significant power burden would be observed. Further, electromagnetic interference/electromagnetic compatibility (EMI/EMC) designs may also not be required. As another advantage, in some instances, the one or more antennas 160 and/or one or more sensors 120 may be retrofit onto existing aircrafts without the need for any design modification.

Advantageously, in certain implementations, a lightning strike prevention program 624 as implementable on a computer system 600 (e.g., a flight computer system) and as described in below paragraphs (or aerial system 100 with respect to FIG. 1), may automatically provide for the control, positioning, and operation of the one or more electroscope sensors 120, one or more antennas 130, and the waveform generator 140.

FIG. 6 is a diagram depicting the computer system 600 (e.g., networked computer system and/or server) according to one implementation. FIG. 6 illustrates example hardware components in the computer system 600 that may be used to observe lighting and prevent streamer formation and leader attachment 180 to aerial surfaces 110. In certain implementations, the computer system 600 includes a computer 610 (e.g., an aerial computer, a building management/operations computer, a flight computer system, flight controls and avionics computer system) which may be implemented as a server or a multi-use computer that is coupled via a network 640 to one or more networked (client) computers 620, 630. The method 500 may be stored as program code (e.g., active lightning strike prevention program 624) in memory that may be performed by the computer 610, the computers 620, 630, other networked electronic devices (not shown) or a combination thereof. In some implementations, the lightning strike prevention program 624 may read input data (e.g., received measurements from the sensors 120 and pre-determined lighting analysis data) and provide controlled output data to various connected computer systems. In certain implementations, each of the computers 610, 620, 630 may be any type of computer, computer system, or other programmable electronic device. Further, each of the computers 610, 620, 630 may be implemented using one or more networked (e.g., wirelessly networked) computers, e.g., in a cluster or other distributed computing system. Each of the computers 610, 620, 630 may be implemented within a single computer or programmable electronic device, e.g., an aerial platform monitoring computer, aircraft flight control computer, a ground-based flight control system, a flight monitoring terminal, a laptop computer, a hand-held computer, phone, tablet, etc. In one example, the computer system 610 may be an onboard flight control computer (e.g., flight control computer that is configured to receive sensor data from the sensors 120).

In one implementation, the computer 600 includes a central processing unit (CPU) 612 having at least one hardware-based processor coupled to a memory 614. The memory 614 may represent random access memory (RAM) devices of main storage of the computer 610, supplemental levels of memory (e.g., cache memories, non-volatile or backup memories (e.g., programmable or flash memories)), read-only memories, or combinations thereof. In addition to the memory 614, the computer system 600 may include other memory located elsewhere in the computer 610, such as cache memory in the CPU 612, as well as any storage capacity used as a virtual memory (e.g., as stored on a storage device 616 or on another computer coupled to the computer 610). The memory 614 may include the active lightning strike prevention program 624 for aerial platforms and surfaces. In certain examples, if the computer 600 is standalone architecture, it would run a low-level script, or alternatively, if it is integrated into a larger aircraft or aerial system, the computer 600 may run on any operating system corresponding to the primary computing system of the aircraft or aerial system.

In FIG. 6, the storage device 616 may include lightning analysis data. In other alternative implementations, the lightning analysis data may be stored in the memory 614, in memory in the computers 620, 630, or in any other connected or networked memory storages devices. The computer 610 may further be configured to communicate information externally. To interface with a user or operator (e.g., pilot, aerodynamicist, engineer, building manager), the computer 610 may include a user interface (I/F) 618 incorporating one or more user input devices (e.g., a keyboard, a mouse, a touchpad, and/or a microphone, among others) and a display (e.g., a monitor, a liquid crystal display (LCD) panel, light emitting diode (LED), display panel, and/or a speaker, among others). In other examples, user input may be received via another computer or terminal. Furthermore, the computer 610 may include a network interface (I/F) 615 which may be coupled to one or more networks 640 (e.g., a wireless network) to enable communication of information with other computers and electronic devices. The computer 610 may include analog and/or digital interfaces between the CPU 612 and each of the components 614, 616, 618 and 620. Further, other non-limiting hardware environments may be used within the context of example implementations.

The computer 610 may operate under the control of an operating system 626 and may execute or otherwise rely upon various computer software applications, components, programs, objects, modules, data structures, etc. (such as the program 624 and related software). The operating system 628 may be stored in the memory 614. Operating systems include, but are not limited to, UNIX® (a registered trademark of The Open Group), Linux® (a registered trademark of Linus Torvalds), Windows® (a registered trademark of Microsoft Corporation, Redmond, Wash., United States), AIX® (a registered trademark of International Business Machines (IBM) Corp., Armonk, N.Y., United States) i5/OS® (a registered trademark of IBM Corp.), and others as will occur to those of skill in the art. The operating system 626 and the program 624 in the example of FIG. 6 are shown in the memory 614, but components of the aforementioned software may also, or in addition, be stored at non-volatile memory (e.g., on storage device 616 (data storage) and/or the non-volatile memory (not shown). Moreover, various applications, components, programs, objects, modules, etc. may also execute on one or more processors in another computer coupled to the computer 610 via the network 640 (e.g., in a distributed or client-server computing environment) where the processing to implement the functions of a computer program may be allocated to multiple computers 620, 630 over the network 640.

Aspects of the present disclosure may be incorporated in a system, a method, and/or a computer program product. The computer program product may include a computer-readable storage medium (or media) having computer-readable program instructions thereon for causing a processor to carry out aspects of the present disclosure. The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. For example, the memory 614, the storage device 616, or both, may include tangible, non-transitory computer-readable media or storage devices.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some implementations, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general-purpose computer, a special purpose computer, or other programmable data processing apparatus to produce a machine, such that the instructions, which execute via the processor of the computer or other programmable data processing apparatus. The machine is an example of means for implementing the functions/acts specified in the flowchart and/or block diagrams. The computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the functions/acts specified in the flowchart and/or block diagrams.

The computer-readable program instructions may also be loaded onto a computer, other programmable data processing apparatus, or other device to cause a series of operational steps to be performed on the computer, other programmable apparatus or other device to perform a computer implemented process, such that the instructions which execute on the computer, other programmable apparatus, or other device implement the functions/acts specified in the flowchart and/or block diagrams.

The flowchart and block diagrams in the Figures illustrate the architecture, functionality, and operation of possible implementations of systems, methods, and computer program products according to various implementations of the present disclosure. In this regard, each block in the flowchart or block diagrams may represent a module, segment, or portion of instructions, which comprises one or more executable instructions for implementing the specified logical function(s). In some alternative implementations, the functions noted in a block in a diagram may occur out of the order noted in the figures. For example, two blocks shown in succession may be executed substantially concurrently, or the blocks may sometimes be executed in the reverse order, depending upon the functionality involved. It will also be noted that each block of the block diagrams and/or flowcharts, and combinations of blocks in the block diagrams and/or flowcharts, can be implemented by special purpose hardware-based systems that perform the specified functions or acts or carry out combinations of special purpose hardware and computer instructions.

In the following description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

Unless otherwise indicated, the terms "first", "second", etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Reference herein to "one example" means that one or more feature, structure, or characteristic described in connection with the example is included in at least one implementation. The phrase "one example" in various places in the specification may or may not be referring to the same example.

Illustrative, non-exhaustive examples, which may or may not be claimed, of the subject matter according to the present disclosure are provided below. Different examples of the device(s) and method(s) disclosed herein include a variety of components, features, and functionalities. It should be understood that the various examples of the device(s) and method(s) disclosed herein may include any of the components, features, and functionalities of any of the other examples of the device(s) and method(s) disclosed herein in any combination, and all of such possibilities are intended to be within the scope of the present disclosure. Many modifications of examples set forth herein will come to mind to one skilled in the art to which the present disclosure pertains having the benefit of the teachings presented in the foregoing descriptions and the associated drawings.

Therefore, it is to be understood that the present disclosure is not to be limited to the specific examples illustrated and that modifications and other examples are intended to be included within the scope of the appended claims. Moreover, although the foregoing description and the associated drawings describe examples of the present disclosure in the context of certain illustrative combinations of elements and/or functions, it should be appreciated that different combinations of elements and/or functions may be provided by alternative implementations without departing from the scope of the appended claims. Accordingly, parenthetical reference numerals in the appended claims are presented for illustrative purposes only and are not intended to limit the scope of the claimed subject matter to the specific examples provided in the present disclosure.

What is claimed is:

1. A method comprising:
   detecting, on or proximate to one or more aerial surfaces, a presence of an electric-field above a predetermined threshold;
   positioning one or more antennas towards the one or more aerial surfaces; and
   transmitting electromagnetic waves towards the one or more aerial surfaces.

2. The method of claim 1, further comprising:
   in response to the detection, automatically activating the one or more antennas.

3. The method of claim 1, wherein the detection is performed by one or more sensors coupled to the one or more aerial surfaces.

4. The method of claim 3, wherein the one or more sensors comprise electroscope sensors.

5. The method of claim 1, wherein the one or more aerial surfaces comprise either an aircraft surface or an aerial platform.

6. The method of claim 1, wherein the one or more aerial surfaces are determined to be in a lightning zone, wherein the lightning zone comprises regions of the aerial surfaces significantly above a predetermined leader attachment threshold.

7. The method of claim 1, wherein the one or more antennas are adjoined on an aircraft, a building, or a monument, and wherein the one or more antennas are configured to radiate electromagnetic waves at the electric-field.

8. The method of claim 1, wherein each of the one or more antennas comprise a waveguide, a transmitter, and an open-ended conical or pyramidal shaped horn.

9. The method of claim 1, further comprising:
generating the electro-magnetic waves by a waveform generator coupled to the one or more antennas.

10. A system comprising:
one or more sensors coupled to one or more aerial surfaces and configured to detect whether a presence of an electric field, on or proximate to one or more aerial surfaces, is above a predetermined threshold; and
a control system coupled to the one or more sensors, and configured to receive sensor data from the one or more sensors and to activate one or more antennas to transmit electro-magnetic waves to the one or more aerial surfaces.

11. The system of claim 10, further comprising:
a waveform generator configured to generate and transmit the electromagnetic waves to the one or more antennas.

12. The system of claim 11, further comprising:
a power source coupled to the waveform generator and the one or more antennas, wherein the power source comprises one of a generator, an alternator, a local grid, an ultracapacitor, a supercapacitor, a regenerative system, an auxiliary power unit, or a battery.

13. The system of claim 10, wherein each of the one or more antennas comprise a waveguide, a transmitter, and an open-ended conical or pyramidal shaped horn.

14. The system of claim 10, wherein the one or more aerial surfaces comprise either an aircraft surface or an aerial platform.

15. The system of claim 10, wherein the one or more sensors comprise electroscope sensors.

16. The system of claim 10, wherein the one or more antennas are configured to transmit the electromagnetic waves omni-directionally or in one primary direction.

17. The system of claim 10, wherein the one or more sensors are wirelessly coupled to the control system.

18. The system of claim 10, wherein the control system is configured to automatically activate the one or more antennas.

19. The system of claim 18, wherein the control system comprises a flight computer system.

20. A computer system comprising:
a processor; and
a memory accessible to the processor, the memory storing instructions that are executable by the processor to perform operations comprising:
detecting, on or proximate to one or more aerial surfaces, a presence of an electric-field above a predetermined threshold;
positioning one or more antennas towards the one or more aerial surfaces; and
activating one or more antennas to transmit electromagnetic waves towards the one or more aerial surfaces.

* * * * *